June 23, 1970             G. W. KREIG             3,516,690

WELDED COUPLING CONSTRUCTION WITH BONDED LINER

Original Filed March 16, 1966             2 Sheets-Sheet 1

INVENTOR.
GALEN W. KREIG
BY
Robert E. Breidenthal
ATTORNEY

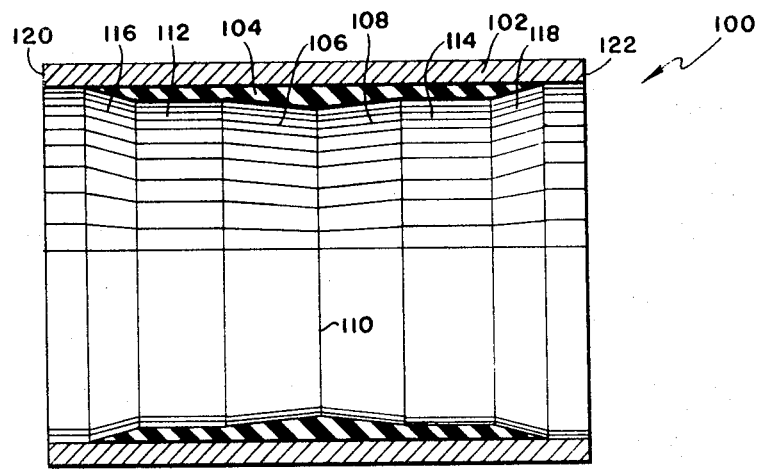
FIG. 5
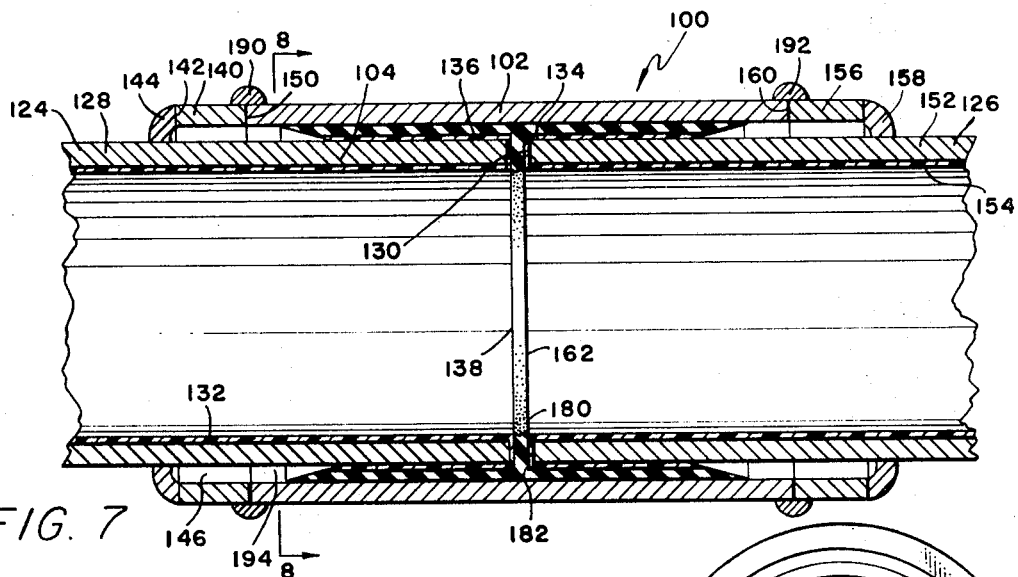
FIG. 7
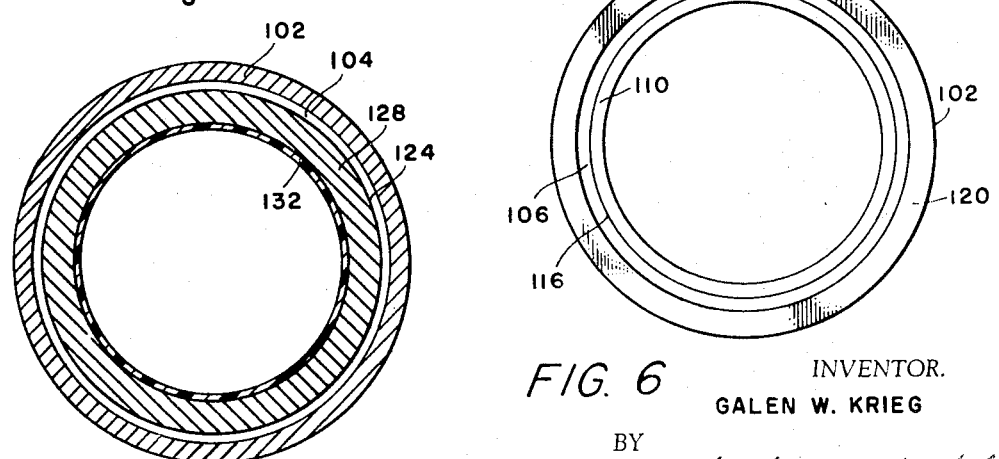
FIG. 8
FIG. 6
INVENTOR.
GALEN W. KREIG
BY Robert E. Breidenthal
ATTORNEY United States Patent Office 3,516,690
Patented June 23, 1970

3,516,690
WELDED COUPLING CONSTRUCTION WITH
BONDED LINER
Galen W. Kreig, 2631 Somerset Drive,
Wichita, Kans. 67204
Original application Mar. 16, 1966, Ser. No. 534,779, now Patent No. 3,441,294. Divided and this application Apr. 29, 1968, Ser. No. 785,405
Int. Cl. F16l *13/02, 59/16*
U.S. Cl. 285—55                                    2 Claims

ABSTRACT OF THE DISCLOSURE

A coupling for coupling adjacent ends of aligned pipes comprising a cylindrical sleeve having an elastomeric liner therein that is securely bonded throughout its axial extent to the internal surface of the sleeve. The liner is of relatively reduced and minimal diameter at a position intermediate its opposite ends, and from adjacent such position the liner is of progressively increasing or flaring diameter. The liner can and in a preferred embodiment does have outwardly or oppositely facing internal shoulders formed at the junctures of the flaring portions of the liner with the minimal diameter portion of the liner. The coupling is secured to pipes that are coaxially received in radially spaced relation within the opposite ends of the sleeve (such pipes being in sealing engagement with the liner) by the opposite ends of the sleeve being welded to the pipes, or alternatively, to the adjacent ends of annular members that are concentrically spaced about the pipes, such annular members being secured to their respective pipes at their remote extremities, the latter alternative being especially effective, on providing sufficient axial extent for the annular members, to minimize the heat conducted to the pipes on welding the coupling sleeve to the adjacent ends of such annular members.

---

This is a division of my U.S. Pat. No. 3,441,294 entitled Welded Coupling Construction With Bonded Liner which issued Apr. 29, 1969.

This invention relates to new and useful improvements in pipe couplings and coupled pipe constructions, and more particularly pertains to means for coupling unthreaded pipes together in such a manner as to be especially well suited for the handling of high pressure and/or corrosive fluids.

Generally speaking, the present invention has the same objectives as my U.S. Pat. No. 3,172,934, entitled Bonded Coupling Liner Fabrication and Installation Process, which issued Mar. 9, 1965, and my U.S. Pat. No. 3,427,-050 entitled Coupling With Bonded Liner, which issued Feb. 11, 1969, and the disclosures of said patents are incorporated herein by reference.

The primary object of this invention is to provide a coupling construction effective to prevent leakage at elevated pressures and in which corrodible portions of the coupling are not contacted by fluids passing therethrough.

Another important object of the invention is to provide a coupling construction such that the components can be readily standardized as to sizes and can be manufactured at low cost by persons of ordinary skill.

Another important object of the invention is to provide a coupling construction having a strength comparable to directly welded pipe joints with respect to compression or tension loads that may exist axially through the coupling as well as with respect to bending movements that may be applied through the coupling.

Another important object of the invention is to provide a welded coupling construction such that relatively little welding skill will be required in assembly as compared to the high degree of welding skill required in the direct welding of pipe joints together by a continuous bead of welding.

Another important object of the invention is to provide a coupling construction employing lined or coated metallic pipes wherein fluids passing therethrough are prevented from contacting metallic parts.

Still another important object of the invention is to provide connecting and heat dissipating structure such that a metallic pipe can be coupled by welding without subjecting the metallic pipe to such elevated temperatures that would be destructive of the materials of linings or coatings of the pipe and/or the bonding of such linings or coatings.

One broad aspect of the invention involves a coupling comprising a cylindrical sleeve having an internal surface, an axially elongated elastomeric liner in the sleeve, said liner throughout its length being substantially concentric with and securely bonded to the internal surface of the sleeve, said sleeve having an internal surface that in repose is circular in transverse section, said internal surface of the liner being substantially symmetrical to a plane normal to the axial extent of the sleeve, and said internal surface of the liner having a minimum diameter coincident with the plane, said internal surface of the liner including a first portion of its axial extent adjacent the plane that progressively increases in diameter proceeding outwardly from the plane and thence merges with a second portion of its axial extent having a substantially constant diameter.

Another broad aspect of the invention involves an improved metallic pipe having an internal coating of a material susceptible to deterioration on the metallic pipe being subjected to welding temperatures such as to enable said pipe to be welded to a coupling without heat deterioration of the coating or the bonding thereof to the metallic pipe, said improved internally coated metallic pipe comprising said pipe having a metallic annular member concentrically disposed about the internally coated pipe at a position adjacent to and spaced from an end of the pipe, said annular member having an end remote from the end of the pipe, and said end of the member being welded to the pipe at a plurality of circumferentially spaced positions, whereby a vented annular space is defined between the pipe and the annular member such as to facilitate the dissipation of heat from the annular member upon an end of the latter adjacent the end of the pipe being subjected to welding temperatures.

Yet another broad aspect of the invention has to do with a coupling construction wherein adjacent end portions of an aligned pair of pipes are received within the opposite ends of a coupling sleeve in axial alignment therewith, the improvement comprising said adjacent end portions of the pipes being spaced apart and of cylindrical external configuration of equal diameters, said sleeve having a cylindrical internal surface of greater diameter than the external diameters of the pipes, and an elongated integral elastomeric liner disposed within and securely bonded throughout its length to the internal surface of the sleeve, said liner including an intermediate portion extending axially between the adjacent end portions of the pipes and outer portions thereof that are contiguous thereto and on opposite sides thereof that axially overlap the adjacent end portions of the pipes, said intermediate portion of the liner and the pipes having substantially equal internal diameters with the intermediate portion of the liner resiliently biasing the adjacent end portions of the pipes from each other, means external of the pipes and adjacent the opposite ends of the sleeve for securing the pipes and the sleeve against withdrawal of the adjacent end portions of the pipes from the sleeve and opposing the resilient bias of the intermediate portion of the liner, said external diameters of the adjacent end portions of the pipes and the internal diameter of the sleeve defining annular spaces intermediate the sleeve and the adjacent end portions of the pipes, and said outer portions of the liner being disposed in said annular spaces with said outer portions being resiliently biased radially against the pipes with the magnitude of such radial bias being at a maximum at the junctures of said outer portion and with said intermediate portion and progressively diminishing axially outwardly therefrom.

A more limited version of the broad aspect of the invention set forth in the preceding paragraph involves the liner being of lesser axial extent than the sleeve and being axially spaced from the opposite ends of the sleeve to define portions of the annular spaces as voids, metallic rings disposed in spaced concentric relationship about the pipes at the opposite ends of the sleeve, said rings abutting the opposite ends of the sleeve, means at extremities of the rings remote from the sleeve securing the rings to the pipes, and said means for securing the pipes against withdrawal from the sleeve comprising the opposite ends of the sleeve being welded at circumferentially spaced positions to the rings.

An important feature of the invention resides in the elastomeric liner having internal surfaces, whereby the pipe is coaxially aligned with the tapered portion prior to and after entry into the latter. The sliding fit of the cylindrical portion can be of such tolerance that the same in addition to the centering and guiding functions serves a sealing function on the pipe being forced into the tapered portion because of a small degree of movement of liner material in the reverse direction. A further related feature resides in the provision of a tapered internal surface for guiding an end of the pipe into the cylindrical portion.

Another very important feature of the invention resides in plastic lining or internal coating of the pipe being continued over the end of the pipe received in the liner of the coupling sleeve and over the exterior surface of the pipe adjacent such end, whereby corrosion protection to the pipe is enjoyed with respect to any possible migration of fluid between the pipe and the elastomeric liner as this confines contact of such leaking fluid to non-metallic surfaces.

Still another very important feature of the invention resides in the provision of structure whereby vented voids facilitate dissipation of heat and possible consequent heat damage to either any lining or coating of the pipe or the elastomeric liner of the coupling sleeve.

A final very important feature of the invention resides in the elastomeric liner being securely bonded to the internal surface of the metallic coupling sleeve, whereby fluid is virtually positively excluded from such surface and in any event such fluid would be very minute in quantity, and static or stationary in location, so that the possibility of replacement or replenishment by fresh corrosive fluid is virtually eliminated, and would be substantially constrained against spreading in its area of contact. In addition to such bonding preventing axial displacement of the liner, perhaps the most important function of the bonding is to insure proper sealing distribution of the material of the elastomeric liner after the pipe has been inserted a predetermined distance thereinto, this distribution preferably including a minor degree of backflow of such material into the region of the cylindrical configuration so as to close the clearance thereof in repose and cause material in such region to be radially biased against the pipe.

These and other objects, aspects, features and functions of the invention will become very evident during the ensuing description of presently preferred embodiments illustrated in the accompanying drawings, wherein:

FIG. 5 is a central longitudinal sectional view of another modification of a coupling sleeve with bonded elastomeric liner of the invention, and illustrates in particular the internal configuration of the liner when in repose;

FIG. 6 is an end view of the structure shown in FIG. 5;

FIG. 7 is a central longitudinal sectional view of the structure shown in FIGS. 5 and 6 applied to couple specially coated steel pipes, and illustrates heat dissipation structure in the region of welded connection of the pipes to the coupling sleeve; and, FIG. 8 is a transverse sectional view taken upon the plane of the section line 8—8 in FIG. 7.

Figure 1:
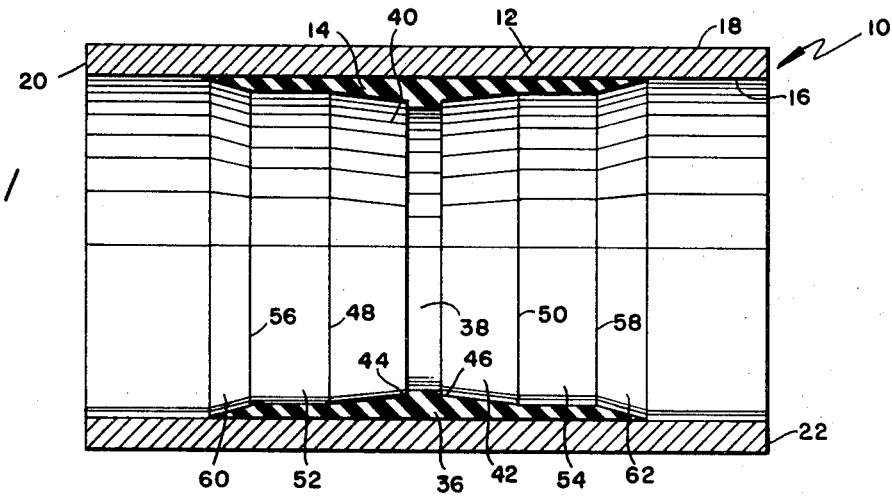
FIG. 1 is a central longitudinal sectional view of a coupling sleeve with bonded elastomeric liner according to the invention, and particularly shows the internal surface configuration of the liner when the latter is in repose.

Referring now to the drawings wherein like numerals designate like parts throughout the various views, and directing attention initially to the embodiment of the invention shown in FIGS. 1 through 4, the reference numeral 10 designates generally a coupling comprised of a metallic coupling sleeve 12 and an elastomeric liner 14.

The coupling sleeve 12 is as clearly shown a straight length of steel tubing having cylindrical inner and outer surfaces 16 and 18 and terminating at its opposite ends 20 and 22 in planes normal to the axis of the coupling sleeve 12. Highly satisfactory working models of the coupling 10 have been made wherein the coupling sleeve 12 has been made of hot roll and cold roll steel and seamless and drawn over mandrel type tubing. Though not, of course, limited to such a range of values, in making working models of differing diameters the ratio of inside diameter of the coupling sleeve 12 to the axial length of the coupling sleeve 12 has been varied from 1½" inside diameter to 12¼" inside diameter. Exemplary of the dimensions of a highly successful working model is a 5⅞" length of 2⅞" O.D. DOM type tubing, the same having internal and external diameters of 2½" and 2⅞", respectively. Such exemplary coupling sleeve 12 was found when ultimately assembled to couple pipes of 2⅜" external diameter together to successfully withstand fluid pressures of 5,000 pounds per square inch without leakage or any damage to the coupling construction, and in fact the failure pressure either with respect to leakage or damage to the coupling construction was not reached during tests. The coupling construction utilizing a coupling sleeve 5⅞" long and internal and external diameters, respectively, of 2½" and 2⅞" was found during tests to neither leak nor show any evidence of failure at pressures up to and in excess of 5,000 pounds per square inch. Working model constructions have been made and demonstrated highly successful for their intended purposes ranging from 1½" to 12¼" internal diameter, and no limits as to minimum and maximum size of couplings has been found; and therefore the principles of the invention are not limited whatever to the range of sizes of successful working models thus far made and tested with most gratifying results.

Figure 3:
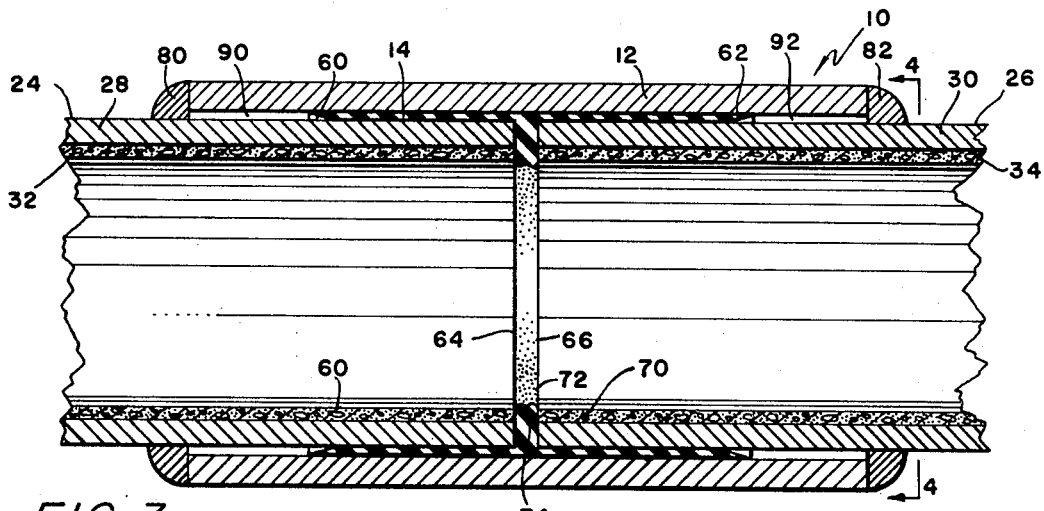
FIG. 3 illustrates in central longitudinal section the coupling sleeve with bonded liner of FIGS. 1 and 2 applied to couple two joints of cement lined steel pipe.
Figures 2, 4:
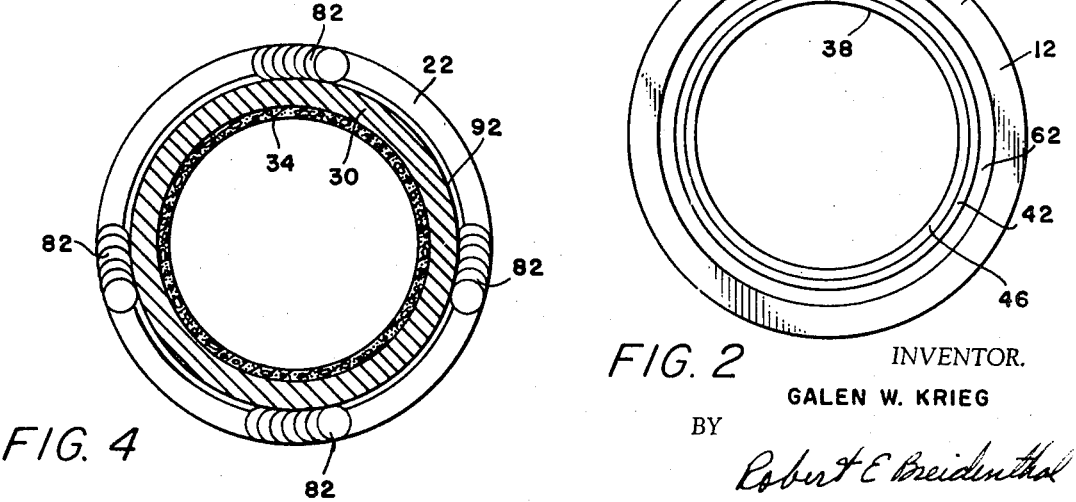
FIG. 2 is an end view of the structure shown in FIG. 1.
FIG. 4 is a transverse sectional view taken along the section line 4—4 of FIG. 3.

The elastomeric liner 14 has a form best suited for use in joining pipes having substantial wall thicknesses such as the composite pipes 24 and 26 shown in FIGS. 3 and 4, such composite pipes 24 and 26, respectively, including cylindrical outer steel tubings 28 and 30 and cement linings 32 and 34. Composite cement lined pipes such as those indicated at 24 and 26 are well known in the art and are in extensive industrial and commercial use. Composite pipes such as those indicated at 24 and 26 are because of their composite nature of relatively greater overall wall thickness for a given working pressure handling capability, and exemplary of such typical extent constructions is a pipe having an outside diameter of 2⅜" and an internal diameter of 2.062" with the wall thicknesses of the steel outer tubular shell and the cement lining being respectively 0.188" and ⅝₄".

As mentioned previously, the elastomeric lining 14 is such as to have an internal configuration particularly well suited for assembly with pipes of relatively great overall wall thickness such as those indicated at 24 and 26. For the purpose of compatibility with and particular suitability for use with pipes of relatively great wall thickness with respect to pipe diameter, the liner 14 includes at a position intermediate the axial extent of the coupling sleeve 12 and preferably at the center of such axial extent of the coupling sleeve 12 an intermediate portion 36 having a substantially cylindrical internal surface 38 that is concentric with the axis of the coupling sleeve 12. The opposite axial extremities of the intermediate portion 36 of the liner 14 are contiguous to liner portions 40 and 42 on opposite sides of the intermediate portion 36, with shoulders 44 and 46 being respectively defined at the juncture of the intermediate portion 36 with the portions 40 and 42.

Extremities 48 and 50 of the liner portions 40 and 42 remote from the intermediate portion 36 are contiguous to and merge with liner portions 52 and 54, respectively, with the remote extremities 56 and 58 of the liner portions 52 and 54 being contiguous to and merging with end portions 60 and 62 of the liner 14.

The internal surfaces of the liner portions 40 and 42, 52 and 54, and 60 and 62 are respectively mere images of each other with respect to the medial plane of the intermediate liner portion 36, and accordingly, the liner 14 has the medial plane of the intermediate portion 36 of the liner 14 as a plane of symmetry. Therefore, a detailed description of the internal surfaces of the liner portions 40, 52 and 60 will respectively suffice for the internal surfaces of the liner portions 42, 54 and 62.

As clearly shown in FIG. 1, the liner 14, when in repose (that is, when the internal surface of the liner 14 is free of stresses applied thereto, it being noted that the liner 14 is of an elastomeric material and of resilient character), has an internal configuration such that the internal surface of the liner portion 14 progressively increases in diameter along its entire length from the shoulder 44 to its axial extremity 48, and in the preferred construction such internal surface of the liner portion 40 is of frusto-conical configuration coaxial with the coupling sleeve 12 and the internal surface 38 of the intermediate portion 36 of the liner 14. At its outermost axial extremity 48 from the intermediate portion 36, the internal surface of the portion 40 has its maximum diameter, and this maximum diameter corresponds to the diameter of the internal surface of the liner portion 52. The internal surface of the liner portion 52 is substantially cylindrical throughout its entire axial extent and concentric with the axis of the coupling sleeve 12. As apparent upon inspection of FIG. 1, the internal taper of the liner portion 40 is such that the same merges rather smoothly with the internal surface of the liner portion 52 at its juncture therewith even when the internal surface of the liner portion 40 is of substantially constant taper throughout its axial extent; however, if desired, as will become amply evident to those skilled in the art, the internal surface of the liner portion 40 can be faired adjacent its outermost extremity 48 so as to merge as smoothly as desired with the internal surface of the liner portion 42.

The internal surface of the liner portion 60 progressively varies along its axial extent from the internal diameter of the liner portion 52 to the internal diameter of the coupling sleeve 12. As will become clear during the ensuing description of the use of the coupling 10, the internal surface of the liner portion 60 can merge as abruptly or smoothly with the internal surface of the liner portion 52 as desired on one hand, and similarly can merge as abruptly or smoothly with the internal diameter of the coupling sleeve 12 as desired on the other hand.

The elastomeric liner 14 is securely bonded throughout its entire axial extent to the internal surface of the coupling sleeve 12. Not only is the elastomeric liner securely and tenaciously bonded continuously about its entire circumference and throughout its entire axial extent to the internal surface of the coupling sleeve 12 so as to adhere very strongly thereto and also to be free of voids therebetween, the elastomeric sleeve 14 is integral and free of voids throughout its volume.

Preferably, the elastomeric liner 14 is formed and bonded to the coupling sleeve 12 in situ so as to more positively assure proper positioning of the liner 14 axially with respect to the coupling sleeve 12 and to more positively assure reliable and thorough bonding of the liner 14 to the internal surface of the coupling sleeve 12. When the liner 14 is to be formed and bonded to the coupling sleeve 12 in situ, the liner 14 can be made of any curable synthetic resin that will tenaciously adhere to a clean or properly treated metallic surface against which it is pressed during such curing, and which synthetic resin on curing will be elastomeric or resilient in character. Furthermore, such cured synthetic resin must be such as to possess the desired degree of resistance to abrasion and/or corrosion to which the same will be subjected during use of the coupling 10 in handling abrasive or corrosive fluids.

Usually the in situ molding, curing and bonding of the elastomeric liner is accompanied by a preliminary treatment of the interior of the metallic coupling sleeve. The internal metallic surface is cleaned and freed of foreign matter as by sand blasting. An adhesive or tie cement is selected such as to be compatible with and appropriate for bonding the material of the liner to the sleeve, and such tie cement, preferably of the elastomeric type, is applied in liquid form to the cleaned internal surface of the coupling sleeve shortly prior to molding the material of the liner in the sleeve. The tie cement and the material of the liner are cured concurrently. For example, when the elastomeric liner is of neoprene, the tie cement or elastomeric adhesive can be of the latex type such as sold by the Gates Engineering Company of Wilmington, Del., as "neoprene tie cement." It is well within the skill of the art to make selection of an appropriate tie cement depending upon such selection as may be made with respect to the material of the elastomeric liner.

A variety of curable synthetic resins or polymerizable mixtures are commercially available suitable for forming and bonding a liner (with appropriate use of a tie cement being made) such as that shown at 14 to the internal surface of the coupling sleeve 12. Exemplary of such curable synthetic resins or polymerizable mixtures are chloroprene (marketed by Gates Engineering Company under the designation Neoprene N–3S), nitrile (marketed by the Goodyear Tire & Rubber Company under the trademark Chemigum), and isobutylene (marketed by the Goodyear Tire and Rubber Company under the trademark Natsyn). Particularly gratifying results have been enjoyed upon the use of chloroprene as marketed by the Gates Engineering Company under the designation Neoprene N–3S, such material yielding upon subjecting the same to a curing temperature of about 325° F. for about 20 minutes when in contact with a cleaned internal surface of the coupling sleeve 12 in a resilient and extremely tough liner 14 that adheres very tenaciously to the coupling sleeve 12 and which will withstand temperatures as high as 280° F. in the use of the coupling 10. Furthermore, the bonded liner 14 resulting from curing such preferred material is highly resistant to abrading in the use of the coupling 10 to handle abrasive fluids, and such liner 14 is highly resistant to corrosive attack by many types of fluids, amongst which may be mentioned salt brines, acids and caustics, and oils.

Alternatively, though not preferred, the liner 14 can be made apart from the coupling sleeve 12 of any desired elastomeric material such as to possess any desired degree of resiliency, and resistance to abrasion and/or corrosive attack. Such liner 14 formed apart from the coupling sleeve 12 can be made of any of the materials indicated previously (including vulcanized natural rubber), and thereafter positioned in the coupling sleeve 12 (it being noted that the resiliency and flexibility of the liner 14 will facilitate such positioning) with a suitable adhesive being applied to the internal surface of the coupling sleeve 12 and/or the external surface of the sleeve 14 to accomplish the desired bonding of the sleeve 14 to the coupling sleeve 12. The adhesive used may be such that the bonding will occur upon the elapse of an appropriate drying time or upon the application of heat for an appropriate period of time. The choice of a suitable adhesive will depend upon the material selected for the liner 14 and it is deemed well within the skill of the art to make an appropriate choice of a suitable and compatible adhesive. For example, neoprene tie cement can be used for such an adhesive when the liner 14 is made of neoprene, such adhesive serving upon the application of a temperature of about 325° F. for about 20 minutes to attain the desired degree of bonding.

By way of example, the dimensions of the liner 14 used with a coupling sleeve 12 having internal and external diameters of 2½" and 2⅞", respectively, and suitable for use with composite pipes such as those indicated at 24 and 26 having respectively internal and external diameters of 2.062" and 2⅜", the liner 14 was made of neoprene that was molded, bonded and cured in situ having an intermediate portion 36 having an internal diameter of 2.180" and an axial length of ⅝₁₆". The shoulders 44 and 46 were each of 2.260" radial extent so that the minimum diameters of the internal surfaces of the liner portions 40 and 42 were 2.260". The internal surfaces of the liner portions 40 and 42 were of frustoconical configuration such as to be defined by a cone having an apex angle of 6°, with each of such liner portions 40 and 42 having an axial extent of ¼". With such configuration, the major diameter of the liner portions 40 and 42 was 2.405" with the liner portions 52 and 54 each being of cylindrical inner configuration of 2.405". The axial extents of each of the liner portions 52 and 54 was 1", and the internal surfaces of the liner portions 60 and 62 were each about 2.450" and approximately conforming to conical surfaces having apex angles of about 6°.

FIG. 3 shows composite pipes 24 and 26 dimensioned as indicated in the previously given dimensional example of the coupling sleeve 12 and liner 14 as assembled with and coupled by the latter, it being noted that the adjacent ends 64 and 66 of the pipes 24 and 26 terminate in planes normal to the axis of the coupling 10. The assembly illustrated in FIG. 10 will be best appreciated on giving brief initial consideration to the manner in which the adjacent end portions of the pipes 24 and 26 are assembled with the coupling 10. The end 64 of the pipe 24 is introduced into the end 20 of the coupling 10 and the internal surface of the liner portion 60 tends to guide entry of the end 64 of the pipe 24 into the extremity 56 of the liner portion 52, though such guiding function of the liner portion 60 is not essential inasmuch as the internal diameter of the liner portion 52 is such as to afford a minor degree of clearance so that at most only a minor degree of sliding friction is encountered on further introduction of the pipe 24 into the coupling 10 as the end 64 of the pipe 24 proceeds along the axial extent of the liner portion 52. Actually the internal diameter of the liner portion 52 with respect to the external diameter of the pipe 24 is not particularly critical, it only being deemed desirable that the end 64 of the pipe 24 can be introduced along the axial extent of the liner portion 52 without the application of a great deal of force. Generally, a matter of thirty thousandths of an inch is desirable to easily accomplish such stage of pipe insertion notwithstanding some irregularity as to the pipe 24 or the internal surface of the liner portion 52 departing slightly from being truly circular. Such provision of clearance is not at all essential in that the elastic or resilient character of the material of the liner 14 will accommodate to irregularities as may exist between the internal configuration of the liner portion 52 and the external configuration of the pipe 24.

The end 66 of the pipe 26 is introduced through the liner portion 54 in a similar manner.

After the ends 64 and 66 of the pipes 24 and 26 have been positioned to coincide substantially with the remote extremities 48 and 50 of the liner portions 40 and 42, the pipes 24 and 26 are at least in the vicinity of their adjacent ends 64 and 66 concentric with the liner 14 and the coupling sleeve 12, and thereafter with portions of the pipes 24 and 26 remote from the coupling 10 held in substantial alignment, the application of equal axial forces to the pipes 24 and 26 urging them toward each other causes substantially equal rates of progressive movement of the pipes inwardly in the liner 14 because of the symmetry of the latter. Such equality of force is of course easily obtained by simply forcing the pipes 24 and 26 endwise toward each other without the application of any other axial force against the coupling 10. The adjacent ends 64 and 66 during their progressive movement along the axial extents of the guide portions 40 and 42 cause a radial compression of the guide portions 40 and 42 and the compressive forces in such guide portions 40 and 42 are so distributed because of the elasticity of the material permitting the same to move so as to tend to relieve such stresses or forces in such a manner that some of the material of the liner 14 that is normally disposed within the portions 40 and 42 when the liner 14 is in repose moves axially from the plane of symmetry and into the region of the liner portions 52 and 54 so as to close whatever tolerance had been thereat provided for the pipes 24 and 26 and radially bear in a resilient manner against the external surfaces of the pipes 24 and 26. That such what may be termed "reverse flow" of material of the liner 14 actually does occur has been repeatedly confirmed by cutting longitudinal sections of partially assembled as well as fully assembled coupling constructions and examining the liner 14 in the regions of the portions 52 and 54 thereof.

The force applied to introduce the pipes 24 and 26 into the coupling 10 is applied for such period of time and in such an amount that the adjacent ends 64 and 66 are not merely brought into engagement with the shoulders 44 and 46 but are still further urged towards each other a further amount such as to axially compress the annular volume of the liner 14 intermediate the shoulders 44 and 46 so as to cause the axially compressed portion 36 of the liner 14 to move radially inwardly to such an extent as to be substantially coterminous with the internal surfaces 68 and 70 of the pipes 24 and 26 as indicated at 72 in FIG. 3. It will be noted at this point that the axial ends 64 and 66 of the pipes throughout their entire wall thickness (both steel and cement lining) are tightly forced against the compressed portion 74 of the resiliently or elastically deformed liner 14, or stated otherwise the liner 14 is axially biased compressively against the adjacent ends 64 and 68 of the pipes 24 and 26.

During the final states of movement of the pipes 24 and 26 towards each other so as to compress the guide portion 74 therebetween, such internal stresses and forces within the material of the liner 14 further contribute to the previously mentioned "reverse flow" of material such as to result in radial compression or bias of the liner 14 against the exterior of the pipes 24 and 26 through all or at least a portion of the axial extents of the liner 14 situated at the axial positions of the liner portions 52 and 54 nearest the portions 40 and 42.

When the pipes 24 and 26 have been moved into their positions of final assembly with respect to the coupling 10 shown in FIG. 3, the very tight compressive grip of the liner 14 about the exteriors of the pipes 24 and 26 may be sufficient to hold the pipes 24 and 26 against retrograde movement because of the axial compression of the portion 74 and the liner 14, this is not necessarily true and is certainly not such as prudence would seem to indicate in any coupling construction, and accordingly, means is provided for securing the pipes 24 and 26 against withdrawal of the pipes 24 and 26 from their assembled positions within the coupling 10. Such means takes the form of the ends 20 and 22 of the coupling sleeve 12 being welded as indicated at 80 and 82, respectively, to the external surfaces of the pipes 24 and 26. Such welding is preferably accomplished while the pipes 24 and 26 are fixedly held in the desired assembled relationship to the coupling 10. Whereas the cement liners 32 and 34 are of such character as to withstand the temperatures to which they are subjected during the application of the welding 80 and 82, it is desirable that the liner 14 be protected against subjection to temperatures because of the welding that might be deleterious in effect, such as impairing the bond of the liner 14 to the coupling sleeve 12, excessively cure or embrittle the material of the liner 14, or tend in any way to impair the continuity and the magnitude of the resilient forces maintaining the liner 14 direct and forcible engagement with not only the external cylindrical surface of the pipes 24 and 26 but also with the planar ends 64 and 66 thereof constituted of the tubular steel material 28 and the cement lining material 32.

In order to protect the liner 14 against the application of destructive temperatures thereto such as would normally be expected to result from welding a coupling sleeve, it will be noted that the axial extent of the coupling sleeve 12 is substantially greater than that of the liner 14, whereby the opposite axial extremities of the liner 14 are spaced axially a substantial interval from the ends 20 and 22 of the coupling sleeve 12. Such spacing extends the length of any heat conduction path from the welding to the liner. Additionally, it will be noted that such spacing in conjunction with the internal diameter of the coupling sleeve 12 being substantially greater than the external diameter of the pipes 24 and 26 results in annular voids 90 and 92 being defined adjacent the opposite ends 20 and 22 of the coupling sleeve 12. As clearly shown in FIG. 4 with respect to welding 82, each of the weldings 80 and 82 is in the form preferably of circumferentially spaced areas of welding, with the result of venting the voids 90 and 92 to the atmosphere during the process of completing the welding; air heated within the voids being free to circulate not only within such void space so as to distribute and otherwise dissipate heat but additionally can circulate through the venting thereby afforded for replacement or entry of cool ambient air into the voids 90 and 92. In fabricating structure such as shown in FIG. 3, it has been found that the provision of annular voids having an axial extent as little as ¼" and a radial thickness of 1¾" has been ample to protect neoprene guides against any damage or deleterious effect detectable under critical examination. Even if, as may be desired for purposes of strength and as is possible because of the tolerance of conventional cement linings to high temperatures, the welding can be continuous about the entire circumference of the ends of the coupling sleeve 12 without harmful results due to overheating the liner 14 on suitably sizing the volume of the voids 90 and 92, it being observed that until completion of an entire circle of welding that air may circulate into and out of the voids so as to distribute and aid the dissipation of heat prior to transmission of destructive temperatures to the liner.

It is to be particularly pointed out that the sealing function of the coupling 10 as between the adjacent ends of the pipes 24 and 26 is not dependent upon the quality of the welding 80 and 82 so long as the welding is sufficient in strength to prevent withdrawal of the pipes from the coupling 10. Accordingly, the welding 80 and 82 can be accomplished by relatively unskilled workers as compared to the degree of skill required by welders that butt weld pipe ends together so as to directly seal by welding, inasmuch as the welding 80 and 82 can largely be in the nature of tack welding.

For any given geometry of the coupling 10 and the pipes 26 and 28, an extent of predetermined pipe insertion into the coupling 10 is required so that the exposed internal surface 72 of the portion constitutes effectively a cylindrical continuation of the internal surfaces of the pipes, and for this reason it is, of course, possible that each of the pipes be inserted into the coupling 10 independently of the other, with such insertion being made simply to place an end of the coupling sleeve 12 in registry with an appropriately scaled mark, not shown, on the exterior of the pipe, and with the pipe and the coupling sleeve 12 held in such position the appropriate welding be performed. Such insertion to a scaled mark can be employed when concurrently inserting both of the pipes, it being noted that the symmetrical configuration of the internal surfaces of the liner 14 virtually assures positive equal insertion of the two pipes when no separate axial force is applied against the coupling 12 itself. The amount of axial force of insertion required increases steeply as the extent of insertion approaches the desired final degree, and this is especially true when both pipes are inserted simultaneously, and such steepness in the rate of required force makes it possible to judge appropriate extent of insertion solely from the extent of force applied, with the actual extent of force applied being previously ascertained and made of predetermined character with respect to scaled pipes, as will be readily understood by those skilled in the art.

The assembled pipe coupling construction shown in FIG. 3 is very efficient with respect to its intended functions. Since the internal surface 72 of the liner 14 is substantially a cylindrical continuation of the internal surfaces of the joined pipes, very little if any resistance to fluid flow or contribution to turbulent flow of fluid is caused thereby. The axial compression of the liner portion 74 makes such a tight seal against the adjacent ends of the pipes and particularly with respect to the adjacent ends of the cement liners that a very effective seal is obtained therebetween so as to prevent or at the very least very greatly limit any intrusion of fluid between the liner portion 44 and cement liner material contacted thereby to reach the steel outer shell of the pipe. The resilient character of the material of the portion 74 in conjunction with axial compression accommodates the areas of contact to minor irregularities so as to exclude fluid. Furthermore, high fluid pressures within the pipes 24 and 26 such as would ostensibly tend to increase any tendency for leakage to occur results in a function which largely if not entirely offsets such increased tendency to leakage. Such function results from the fact that such high fluid pressure acting against the internal surface 72 applies a radial pressure against the liner portion 74 which in turn results in a tendency of such liner portion 74 to expand axially between the adjacent ends of the pipes between which it is confined, with consequent additional axial force being brought into existence as between the liner portion 74 and the adjacent ends of the cement liners.

For any fluid to leak from the structure shown in FIG. 3, the fluid would not only have to leak past the surfaces maintained in sealing contact existing because of the axial compression of the liner portion 74, but such fluid would additionally and thereafter have to pass by the areas of sealing contact resulting from the radial compression of the liner 14 between the coupling sleeve 12 and the external cylindrical surfaces of the pipes 24 and 26. Such leakage is rendered most unlikely for the reason that the greatest degree of radial compression and resulting sealing pressure contact between the liner and the cylindrical exterior of the pipes is immediately adjacent the liner portion 74, whereby there is least likelihood of any avenue of leakage of channel-like character presenting itself to the passage of leakage fluid.

Notwithstanding the fact that such radial compression of the liner 14 progressively diminishes axially outward from the liner portion 74, such resistance would nevertheless have to be overcome for any fluid to actually leak from the coupling assembly shown in FIG. 3. Accordingly, even if the coupling construction failed to the extent of not positively stopping any leakage whatsoever, such leakage would nevertheless be restricted to a very slow rate.

Any leakage escaping entirely between the liner 14 and the external surfaces of the pipes would in the use of circumferentially spaced welding be free to drain from the coupling construction between the areas of welding so as not to accumulate and thereby expedite corrosion processes. If desired or deemed expedient for either the purpose of draining leakage from the voids 90 and 92 or for the purpose of facilitating venting such voids for heat dissipation purposes as discussed previously, the axial extents of the coupling sleeve 14 corresponding to the axial location of the voids 90 and 92 may be provided with such opening or openings therethrough as may be thought appropriate.

It will be appreciated that the coupling construction shown in FIG. 3 is not only such as to be very rugged and durable with respect to axial loads of either compression or tension, but additionally is such that such coupling construction can withstand substantial bending moments therethrough without the incurrence of leakage. The latter is true because of the welded construction, the diameter of the coupling sleeve 12, and because of the resilient axial and radial biasing of the liner 14 between the coupling sleeve 14 and the pipes 24 and 26.

Proceeding now to a consideration of the embodiment of the invention shown in FIGS. 5 through 8, such modification of the invention including a coupling designated generally at 100. The coupling 100 includes a coupling sleeve 102 generally similar to the coupling sleeve 12 of the previously described embodiment of the invention.

The coupling 100 also includes an elastomeric liner 104 tenaciously bonded throughout its entire axial extent to the internal cylindrical surface of the coupling sleeve 102, such elastomeric liner 104 being made of a material such as those previously indicated suitable for the liner 14, and it will be understood that the liner 104 can be fabricated and bonded to the coupling sleeve 102 by any suitable technique such as those previously alluded to in the description of the embodiment of the invention shown in FIGS. 1 through 4. Here again, preferably, the elastomeric liner 104 is molded, bonded and cured in situ with neoprene being an especially preferred material.

The elastomeric liner 104 is quite analogous in its structure and functions to the previously described elastomeric liner 14, and the liner 104 essentially differs from the liner 14 by the omission of the intermediate portion 36 and the attendant shoulders 44 and 46 that formed a part of the liner 14. It will be recalled that one of the principal reasons for providing the portion 36 with the attendant shoulders 44 and 46 of the liner 14 was for the purpose of assuring that when the pipes were in assembled relation with the liner 14 that liner material would be axially compressed between the adjacent pipe ends and expand radially inwardly to coincide with the internal diameters of the pipes, and such pipes because of the cement linings thereof were of relatively greater thickness than pipes either unlined or coated with materials of which a much thinner thickness is required.

Accordingly, the liner 104 which is intended for use with relatively thinner walled pipes need not necessarily include a shouldered intermediate cylindrical portion as sufficient material of the liner 104 can be engaged and axially compressed between the adjacent ends of relatively thin walled pipe so as to obtain the advantages previously described in connection with the liner 14 relative to the relatively thick walled cement lined pipes. With such omission of structure, the elastomeric liner 104 includes liner portions 106 and 108 that correspond generally to the previously described portions 40 and 42, respectively, of the liner 14, and the juncture 110 of the liner portions 104 and 108 constitutes the portion of the liner 104 having a minimum diameter, and such juncture 110 is coincident with a plane of symmetry of the elastomeric liner 104. Similarly, the liner 104 includes portions 112 and 114 that correspond generally to the previously described portions 52 and 54, respectively, of the liner 14, and correspondingly the liner 104 additionally includes portions 116 and 118 similar to the portions 60 and 62, respectively, of the liner 14.

Each of the liner portions 106 and 108 progressively increases in diameter outwardly from the juncture 110 of such portions, and are mere images of each other with respect to such juncture 110. The portions 106 and 108 can be frusto conical in their internal configuration and conformable to cones having apex angles of about 6° (though considerably greater and lesser angles can be employed with excellent results, if desired). The juncture 110 need not be abrupt as between geometrically ideal frustoconical surfaces, and the internal surfaces of the portions 106 and 108 may be rounded axially so that they merge smoothly along a curve into each other. Similarly, the opposite extremities of the internal surfaces of the portions 106 and 108 may be faired so as to smoothly merge with the cylindrical internal surfaces of the liner portions 112 and 114.

The internal surfaces of the liner portions 116 and 118 merely constitute a transition between the internal configuration of the portions 112 and 114 to the internal diameter of the coupling sleeve 102, with such internal surfaces of the portions 116 and 118 serving the additional though not essential function of guiding the adjacent ends of pipes into the liner portions 112 and 114.

The position of the juncture 110 of the liner portions 106 and 108 is preferably at the axial center point of the coupling sleeve 102, and the axial extent of the elastomeric liner 104 is preferably such that the opposite extremities thereof are spaced substantially from the opposite ends 120 and 122 of the coupling sleeve 102.

Attention is now directed to FIG. 7 wherein there is illustrated a coupling construction wherein the coupling 100 shown in FIG. 5 is employed. Though it will become obvious that the coupling 100 can be used with unlined pipe as well as with coated or lined pipes of character different than that to be hereinafter described, it is nevertheless preferred that the coupling 100 be utilized in conjunction with composite pipes such as those indicated at 124 and 126. Each of the pipes 124 and 126 are identical with respect to the features hereinafter specifically pointed out, a detailed description of the composite pipe 24 will suffice for both. The composite pipe 124 includes an outer metallic tubular member 128, preferably steel, that terminates in a substantially planar end edge 130. The metallic member 128 is provided with a synthetic resin liner or coating 132 that extends throughout the axial extent of the tubular member 124 and is additionally continuously extended about the end edge 130 of the tubular member 128 as indicated at 134 and is thence continuously extended about the exterior of the tubular member 128 from the edge 130 for an interval preferably at least as great as the axial extent of the liner portion 106 and which may be advantageously extended over the exterior surface of the tubular member 128 from the edge 130 for an extent equal to the overall axial extent of the liner portions 106 and 112, such portion of the resilient resin applied to the external surface of the tubular member 128 being indicated at 136. The portion of the synthetic resin liner or coating disposed within and secured to the internal surface of the tubular member 128 defines jointly with the latter the composite pipe 124, and it will be seen that with the synthetic resin continuing unbroken about the end 130 of the tubular member 128 and over the portion of the external axial extent adjacent the end 138 of the pipe affords a continuous and unbroken protection to the interior of the tubular member 128, the end 130 of the latter as well as the exterior end portion of the tubular member 128.

A number of synthetic resins suitable for coating or lining metallic tubular members and the means of applying such synthetic resins to tubular members are well known in the art. It is also well known that most if not all of such synthetic resins lack the tolerance to heat such as that of the previously described cement linings 32 and 34, and it will immediately be apparent that composite pipes such as 124 and 126 cannot be directly welded to couplings in the manner that the composite pipes 24 and 26 are described and illustrated as being welded to the previously described coupling 10. For a purpose presently to be described a metallic ring or short metallic cylindrical sleeve 140 is disposed in spaced concentric relation about the pipe 124 at a location substantially spaced from the end 138 of the pipe 124, and such ring 140 is at its end 142 remote from the end 138 of the pipe 134 and is welded as at 144 to the exterior of the metallic tubular member 128 of the pipe 124. The welding 144 is preferably not in the form of a continuous circle or band of welding but is in the nature of tack welding of spaced circumferential positions about the end 142 of the ring 140, much in the manner of the circumferentially spaced welding 82 shown in FIG. 4. Accordingly, an annular chamber or void 146 is defined between the ring 140 and the tubular member 128, and the metallic ring 140 can be considered as metallic means fixed to the tubular member 128 and projecting toward the end 138 of the pipe 124 in spaced relation to the exterior of the latter. Since securance of the ring 140 to the tubular member 128 involves the provision of welding 144 and the subjection of the tubular member 128 to a substantial degree of heat, it will be clearly understood that the ring 140 is welded to the tubular member 124 prior to the application of the synthetic resin or coating 132 to the tubular member 128 as previously described.

The ring 140 terminates at its end 150 adjacent the end 138 of the pipe 124 in a plane normal to the axis of the pipe 124, with the axial spacing of the end 150 of the ring from the end 138 of the pipe 124 being a predetermined amount. Similarly, the composite pipe 126 includes a metallic tubular member 152 and a synthetic resin lining or coating 154, the latter being extended over the end and back up over the external surface of the tubular member 152 as previously described in relation to the pipe 124. Similarly, prior to the application of the synthetic resin lining or coating to the tubular member 152, a ring 156 is secured by circumferentially spaced welding 158 to the tubular member 152, such ring 156 having an end 160 spaced axially from the end 162 of the pipe 126 an amount equal to the spacing of the ends 150 and 138 of the ring 140 and pipe 124, respectively.

Examples of suitable synthetic resins or related type coating or lining materials for use in coating or lining the tubular members 128 and 152 are phenolic (sold by Tube-Kote Company under the trademark TK–2), epoxy (sold by Republic Steel Company under the trademark Intra-Line) and coal-tar epoxy (sold by Pittsburgh Coke & Chemical Company under the trademark Tar-Set), though other suitable materials are known in the prior art. The methods of preconditioning the metallic surfaces of the tubular members 128 and 152 and the methods of applying and bonding the coating or lining materials thereto are well known to those skilled in the art and need not be specifically described. Suffice to say for present purposes the material is usually supplied in a liquid condition and such liquid is caused to flow through a generally horizontally disposed pipe while rotating the latter, and the pipe being thereafter rotated either with or without the application of heat until the coating material has sufficiently dried or cured as not to be subject to running. Usually it is only necessary that the surfaces to be coated are cleaned as by brushing or abrading, though in some instances conventional surface primers may be applied to the metallic surfaces prior to application of the coating or lining material. In the present instance, the end and external surface portions of the tubular members to be coated or lined must also be cleaned or otherwise given such surface treatment as by primers or the like for tenacious adherence of the coating or lining material, and the latter when in liquid condition can be applied to the rotating pipe by either brush or air gun as may be convenient.

The composite pipes 124 and 126, with their rings 140 and 156 attached, are introduced into the opposite ends of the coupling 100 with the guide portions 116 of the liner 104 serving to help center the pipes 124 and 126 with respect to the elastomeric liner portions 112 and 114. It is to be understood that the overall external diameter of the externally coated portion of the composite pipes 124 and 126 generally bears the same relationship to the internal dimensions of the liner portions 112 and 114 previously set forth with respect to the external dimensions of the pipes 24 and 26 in relation to the liner portions 52 and 54. It will therefore be apparent that during the process of urging the pipes 124 and 126 into the positions shown thereof in FIG. 7 that some degree of reverse flow of the elastomeric material of the liner 104 will occur so that the regions of the liner corresponding to the portions 112 and 114 will be radially compressed and biased against the external surface of the pipes 124 and 126.

A sufficient amount of material of the portions 106 and 108 of the liner 104 will be pushed ahead of the ends 138 and 162 of the pipes 124 and 126 that the same will be bunched together and axially compressed between the adjacent ends 138 and 162 of the pipes so as to additionally be radially moved inwardly to define an exposed inner surface 180 constituting substantially a cylindrical continuation of the interiors of the pipes 124 and 126. The portion 182 of the material of the liner 104 and comprised primary of material which in repose was immediately adjacent the juncture 110 is axially compressed so as to be biased against the coated adjacent ends 138 and 162 of the pipes to constitute an effective seal therebetween, all substantially in the same manner as previously described in considerable detail with respect to the embodiment of the invention disclosed in FIGS. 1 through 4.

The predetermined spacing of the ends 150 and 160 of the rings 140 and 156 from the respective ends of their pipes 138 and 162 is such that such ends of the rings abut the ends 120 and 122 of the coupling sleeve 102 when the pipes 124 and 126 are inserted the proper extent into the coupling 100. Accordingly, the rings 140 and 156 when properly attached to their respective pipes as can be readily accomplished through the use of welding jigs positively assure when caused to abut the coupling sleeve 101 precisely the correct amount of pipe insertion as well as rather precise alignment of the pipes 124 and 126. While holding the pipes 124 and 126 so that their respective rings 140 and 156 abut the coupling sleeve 102, the ends 120 and 122 of the coupling sleeve 102 are welded either continuously or preferably at circumferentially spaced positions to the rings 140 and 156 as indicated at 190 and 192. In the light of the description of the embodiment of the invention disclosed in FIGS. 1 through 4, it will be clearly understood that the void 146 as well as a void 194 within the coupling sleeve 102 will be vented between circumferentially spaced welding 144 during the application of the welding 190, with resulting facilitation of heat dissipation such as to protect the liner 104 from heat damage as well as serving to protect the synthetic resin coating or lining 132 from damage. Protection of the synthetic resin coating or lining 132 is facilitated by the fact that all heat passing by metallic conduction from the welding 190 must not only pass along the entire axial extent of the ring 140, but is limited to only the areas of circumferentially spaced welding 144. Additional venting can be readily obtained if deemed necessary or expedient by providing radially extending openings through the ring 140 and/or the portion of the coupling sleeve 102 intermediate the end 120 thereof and the liner 104. Alternatively, or in addition to such supplemental venting provisions, spacers, not shown, can be inserted between the ring 140 and the coupling sleeve 102 to obtain an axial spacing of the ring 140 and the coupling sleeve 102, whereby venting will be obtained through such spacing on the application of circumferentially spaced welding 190. It will be appreciated that similar considerations apply to the welding 192 and dissipation of heat so as to spare the synthetic resin lining or coating of the pipe 126 as well as the material of the liner 104 from damage. It will be appreciated that when spacers are used such as to prevent the rings 140 and 156 from actually abutting the opposite ends of the coupling sleeve 102, such spacers would be removed after they had served their spacing function either prior to or after application of the weldings 190 and 192.

With respect to each of the illustrated and described embodiments of the invention, it will be noted that the practice of the invention is not limited to use with ferrous metals, but can be practiced with respect to non-ferrous metals such as alloys of copper and so forth.

In the light of the foregoing, it is evident that those active in the field of this invention will be enabled to enjoy the advantages thereof. It is also amply evident that each of the illustrated and described embodiments of the invention is susceptible to numerous and various modifications without departing from the spirit of the invention, and accordingly, recognizing that the invention has been described in minute detail for the purpose of conveying a full and complete understanding thereof so that no limitation as to scope of invention is to be thereby implied.

I claim:

1. In a coupling construction wherein adjacent end portions of an aligned pair of pipes are received within the opposite ends of a *metallic* coupling sleeve in axial alignment therewith, the improvement comprising said adjacent end portions of the pipes being spaced apart and of cylindrical external configurations of equal diameters, said sleeve having a cylindrical internal surface of greater diameter than the external diameters of the pipes, and an elongated integral elastomeric liner disposed within and securely bonded throughout its length to the internal surface of the sleeve, said liner including an intermediate portion extending axially between the adjacent end portions of the pipes and outer portions thereof that are contiguous thereto and on opposite sides thereof that axially overlap the adjacent end portions of the pipes, said intermediate portion of the liner and the pipes having substantially equal internal diameters with the intermediate portion of the liner resiliently biasing the adjacent end portions of the pipes from each other, means external of the pipes and adjacent the opposite ends of the sleeve for securing the pipes and the sleeve against withdrawal of the adjacent end portions of the pipes from the sleeve and opposing the resilient bias of the intermediate portion of the liner, said external diameters of the adjacent end portions of the pipes and the internal diameter of the sleeve defining annular spaces intermediate the sleeve and the adjacent end portions of the pipes, said outer portions of the liner being disposed in said annular spaces with said outer portions being resiliently biased radially against the pipes with the magnitude of such radial bias being at a maximum at the junctures of said outer portion and with said intermediate portion and progressively diminishing axially outwardly therefrom, said pipes being composite and comprising metallic tubes having linings, said means for securing the pipes against withdrawal from the sleeve comprising the opposite end extremities of the sleeve being welded to the pipes, and said liner being of lesser axial extent than the sleeve and being axially spaced from the opposite ends of the sleeve to define portions of said annular spaces as voids, with the opposite ends of the sleeve being welded at circumferentially spaced positions to the pipes, whereby free fluid communication exists between the voids and ambient environment.

2. The combination of claim 1, wherein said elastomeric liner has a configuration in repose that is substantially symmetrical with respect to a plane transverse thereto, with such configuration in repose comprising the internal surface of the liner being relatively reduced at said plane of symmetry and progressively increasing in diameter axially outward from adjacent said plane of symmetry to a diameter approximately that of the external diameter of said pipes and thence being of a cylindrical shape of such diameter axially outward from the plane and finally progressively increasing in diameter to the internal diameter of the sleeve.

References Cited
UNITED STATES PATENTS

| | | | |
|---|---|---|---|
| 2,893,758 | 7/1959 | Dufour et al. | 285—286 |
| 2,209,325 | 7/1940 | Dennis | 285—286 X |
| 3,194,591 | 7/1965 | Weisend | 285—286 X |
| 3,251,612 | 5/1966 | Webbe | 285—55 X |
| 3,266,820 | 8/1966 | Leborgne et al. | 285—55 X |
| 3,266,821 | 8/1966 | Safford | 285—55 X |
| 3,291,506 | 12/1966 | Blakeley | 285—55 X |
| 3,325,191 | 6/1967 | Yates | 285—55 |

THOMAS F. CALLAGHAN, Primary Examiner

U.S. Cl. X.R.

285—286, 369